United States Patent
Halberstadt

(10) Patent No.: US 10,879,788 B1
(45) Date of Patent: Dec. 29, 2020

(54) POWER FACTOR CORRECTOR CIRCUIT WITH DCM/CCM ALGORITHM USING RELATION BETWEEN CURRENT RIPPLE AND SWITCHING INTERVAL

(71) Applicant: NXP B.V., Eindhoven (NL)

(72) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/457,833

(22) Filed: Jun. 28, 2019

(51) Int. Cl.
   *H02M 1/42* (2007.01)
   *H02M 1/08* (2006.01)

(52) U.S. Cl.
   CPC ........... *H02M 1/4208* (2013.01); *H02M 1/08* (2013.01)

(58) Field of Classification Search
   CPC .............................. H02M 1/4208; H02M 1/08
   See application file for complete search history.

(56) References Cited

U.S. PATENT DOCUMENTS

| | | | |
|---|---|---|---|
| 8,076,920 B1 * | 12/2011 | Melanson | H02M 3/005 323/299 |
| 8,351,232 B2 | 1/2013 | Zhang | |
| 8,482,942 B2 * | 7/2013 | Choi | H02M 1/4208 363/125 |
| 8,599,579 B2 | 12/2013 | Kuebrich et al. | |
| 9,219,408 B2 * | 12/2015 | Bianco | H02M 1/4208 |
| 9,479,046 B2 | 10/2016 | Lin et al. | |
| 9,621,028 B2 | 4/2017 | Lin et al. | |
| 10,439,508 B2 * | 10/2019 | Adragna | H02M 7/06 |
| 10,536,068 B2 * | 1/2020 | Anwar | H02M 1/08 |
| 2005/0017695 A1 * | 1/2005 | Stanley | H02M 1/4208 323/207 |

OTHER PUBLICATIONS

Power Factor Correction, "Improving Efficiency and Power Factor at Light Load", Issue 3, 2016 Power Electronics Europe, www.power-mag.com, 3 pgs., 2016.
On Semiconductor, "Power Factor Correction Stages Operating in Critical Conduction Mode", AND8123/D, Nov. 2014, Rev. 2, 18 pgs., 2014.
Monolithic Power Systems, "MPS HR1200: PFC + LLC Combo Controller", 30 pgs., Jan. 7, 2016.
Wikipedia, "Mains electricity", retrieved from the internet at https://en.wikipedia.org/wiki/Mains_electricity, on Oct. 9, 2018, 9 pgs.
Monolithic Power Systems, "HR1200 High Performance PFC + LLC Combo Controller", 34 pgs., 2017.

* cited by examiner

*Primary Examiner* — Kyle J Moody

(57) ABSTRACT

A power factor corrector circuit and a method of operating the power factor corrector circuit include a power factor corrector operable in a conduction mode within an operating frequency between a minimum value and a maximum value. A measured variable k1 can define a relation between a predetermined level set for a current ripple of a peak current Ipeakh minus a peak current Ipeakl in combination with a variable a that sets a ratio between a primary and secondary stroke interval and a resulting time period.

20 Claims, 10 Drawing Sheets

US 10,879,788 B1

POWER FACTOR CORRECTOR CIRCUIT WITH DCM/CCM ALGORITHM USING RELATION BETWEEN CURRENT RIPPLE AND SWITCHING INTERVAL

BACKGROUND

General electric alternating current (AC) power ("mains power" or "mains electricity" or simply "mains") may need to be converted into direct current (DC) power for use by a multitude of consumer devices. A power management system can convert AC power from the main source into DC power using components such as, for example, inductors, diodes, capacitors, transformers and other switches (e.g., junction field effect transistors, metal-oxide-semiconductor field-effect transistors, etc.) with low losses in power dissipation.

Losses in the main source may be decreased by focusing on the harmonics of the current drawn from the main source and the phase relationship between the mains voltage and the current drawn from the main source. The efficiency of the mains power supplying can be measured by the power factor. The power factor of an AC to DC electric power system may be defined as the ratio of the real power drawn from the main source compared to the product of the root means square (rms) voltage '$V_{rms}$' and the rms current '$I_{rms}$'.

A power factor corrector (PFC), which may include a bridge rectifier, a switch-mode power supply (SMPS), and control circuits, can be used to help maximize the power factor in power management systems and can also be used for power management in personal computers, adapters, lighting and so on. A power factor can therefore be a parameter for use in evaluating a PFC's overall performance.

PFC circuits can be used in applications such as power converters to control the phase of the input current and help maximize power in power management systems. A PFC circuit (also referred to simply as a "PFC") may be needed for a SMPS having power levels above, for example, 75 watts. For a power level above approximately 300 watts, a CCM (Continuous-Conduction Mode) operation can become attractive because this can lead to the use of small EMI (Electromagnetic Interference) filters, which may be useful in smaller electronic devices.

Traditional PFC circuits may use fixed frequency in CCM applications. Close to the main zero-crossing, CCM may not be maintained, and a changeover from a BCM (Boundary Conduction Mode) to a (Discontinuous-Conduction Mode) DCM may occur in association with a rising frequency. Unfortunately, this feature can result in a lower efficiency close to the main zero-crossing.

For optimum efficiency, it may be advantageous to use CCM at higher power levels around the peak voltage of the main power supply and then use DCM in other situations.

Some DCM applications may employ a topology involving Ton ('Timer On') control for the PFC switch. Ton control can offer the advantage for BCM of automatically correcting the mains current shape for a high power factor. This is because $di/dt = V_{mains}/L_{ind}$, wherein $L_{ind}$ is the main inductor value. Thus, with a fixed Ton, the primary peak current may be proportional to the momentary mains voltage. For CCM, the primary current can depend on the current at the end of the previous switching cycle and the switch conduction interval Ton. Therefore, on time control in the manner used in DCM may not be employed in CCM operations.

One CCM operational technique can employ an approach referred to as "average current control". This approach can be based on the fact that the duty cycle of the secondary stroke equals $V_{in}/V_{out}$ where $V_{in}$ can be the input voltage of the PFC and $V_{out}$ can be the output voltage. FIG. 1 depicts a waveform diagram 100 illustrating the concept of average current control CCM as exemplified by waveforms 102, 104, and 106, and a ramp signal 108 and a control signal 110. The waveforms shown in the waveform diagram 100 of FIG. 1 demonstrate that when the duty cycle becomes smaller than an equilibrium value, the duration of the secondary stroke can also become smaller. This can offer less reduction for the inductor current and therefore an increase in the current as compared to the current at the start of the switching cycle (e.g., see waveform 102 in FIG. 1). This can be demonstrated by "duty_off<equilibrium→Iay rises" as shown in FIG. 1, wherein "Iay" can refer to an average inductor current and "duty_off" can refer to a duty cycle.

When the duty cycle is higher than the equilibrium, an increase in the reduction of the inductor current can occur, and therefore a corresponding decrease in the current can result, as compared to the current at the start of the switching cycle (e.g., see waveform 106 in FIG. 1). This can be demonstrated by "duty_off>equilibrium→Iay falls" as shown in FIG. 1, wherein "Iay" can refer to an average inductor current and "duty_off" can refer to a duty cycle.

The duty cycle may be generated by a ramp signal 108 (i.e. a "ramp" for PWM (Pulse Width Modulation)) and a control signal 110, where the ramp signal 108 and the control signal 110 can be then subject to a comparison operation by a comparator that generates the duty cycle signal.

This means that an equilibrium may occur when the control signal 110 is proportional to $V_{in}/V_{out}$. As the voltage $V_{out}$ is normally regulated to a fixed value, the result can be that the control signal can be proportional to the voltage $V_{in}$. By making the control signal 110 proportional to the sensed current, the system can generate an input current proportional to the momentary mains voltage ($V_{mains}(t)$), which can fulfill the power factor.

FIG. 2 depicts a schematic diagram of a PFC circuit 130 that can apply the average current control principle. The PFC circuit 130 shown in FIG. 2 includes a pair of diodes 132, 134 and another pair of diodes 136, 138. The diodes 134 and 138 can connect to ground 140. An inductor 144 can connect to diodes 132 and 138, and can also connect to ground 140 and the output of the diode 132 and the diode 136.

The PFC circuit 130 can further include an oscillator 146 that connects to the negative input of an amplifier 148 that can output PWM waveforms that can be supplied to a transistor 150. The inductor 144 can also connect to the transistor 150 and to a diode 152. An output capacitor 154 can connect to the output of the diode 152 and to ground 141. The output capacitor 154 can be electronically located between a ground output ("Out Gnd") and the output of the diode 152.

The PFC circuit 130 can further include a resistor 158 ("$R_{cp}$") that is coupled to a shunt resistor 156 ("$R_{shunt}$"), ground 140 and the diode 138 and the diode 134. The shunt resistor 156 can be further connected to a resistor 160, which in turn can be coupled to a capacitor 164 and to a current amplifier 162. The capacitor 164 can be further coupled to a capacitor 166 and to a resistor 168. The capacitor 166 and the resistor 168 can also connect to the output of the current amplifier 162. The capacitor 166 and the resistor 168 can be arranged in parallel with one another and can further connect to the positive input of the amplifier 148 and the output of the current amplifier 162. That is, the current amplifier output (i.e., output '$V_{ca}$') can connect to the positive input of the amplifier 148.

FIG. 3 depicts a schematic diagram of a control circuit 180 that can employ a multiplier approach. The control circuit 180 can include an AC voltage source 182 that can be offset by a diode 184. The AC voltage source 182 can supply an AC voltage '$V_{AC}$' to a resistor 186 ('$R_{IAC}$') and to an inductor 212. The resistor 186 can be coupled to a multiplier 188 that in turn can connect to a resistor 190 and the positive input of an amplifier 192 whose output can connect to a latch 194. The latch 194 can also be coupled to a gate driver logic component 200 that can connect to a transistor 219.

A resistor 198 can further connect to the transistor 214 and to ground 196. The transistor 214 can be further coupled to the inductor 212 and to a diode 216. A capacitor 218 can connect to the diode 216 and to the resistor 198 (and also to ground 196). The capacitor 218 can be also be arranged in parallel with a load 220. A resistor 210 can connect to the capacitor 218 and to the diode 216 and a resistor 208 and also to the negative input of an error amplifier 202 that outputs a voltage $V_{EA}$. The resistor 208 can also be coupled to ground 206. A reference voltage 204 ("$V_{REF}$") can connect to the positive input of the error amplifier 202. The output from the error amplifier 202 can also be coupled to the multiplier 188.

In the control circuit 180, the control output $V_{EA}$ from the error amplifier 202 can set the desired power level in order to allow the PFC output voltage to be equal to a desired level while delivering power to the load 220. The multiplier 188 can then multiply the control output signal with the mains voltage shape to output a desired current level, which can be then compared with a sensed current level and can be further used to reset the latch 194 in order to define a primary current peak level. The switching cycle can be started by a 'Zcd' (zero current detection) signal in order maintain the system in a BCM.

For a system in BCM operation, the input current drawn from the mains can be proportional to the primary peak current and can also be proportional to the "on time" of the PFC switch. This arrangement can make it easy to render a good power factor. When the system goes to DCM, the average current may be lower for the same primary peak current, because of a ringing interval that may arise after the end of the secondary stroke where no current is drawn from the mains. Some devices may use a PFC circuit where this effect can be compensated by the additional adaption of the primary peak current based on the ratio: Tper/(Ton+Tsec).

A group of equations can be used to define factors for a PFC circuit. Providing for a high power factor means that the input current drawn by the PFC circuit may be proportional to the momentary mains voltage. Ideally, this can be represented by defining a factor K2 according to the equations shown below:

$I\text{in}=k2 \cdot V\text{mains}$ $P\text{in}=V\text{mains} \cdot I\text{in}$ $P\text{in}=V\text{mains} \cdot (k2 \cdot V\text{mains})$ $P\text{in}=V\text{mains}^2 \cdot k2$ Thus, the momentary input current equals the momentary mains voltage times a factor k2. This means that the momentary input power can be proportional to the square of the momentary input voltage.

FIG. 4 depicts a graph 240 and a graph 250 demonstrating the relationship between momentary current voltage and power for a PFC circuit according to the equations discussed above. Graph 240 and curve 242 plot data indicative of Vmains(t) with respect to time 't' based on the equation Pin (t,K2):=Vmains(t)2·k2 wherein k2b:=0.002. Graph 250 depicts curves 252 and 254 respectively for Pin(t,k2b) and Pin (T,k2Aa) wherein k2a=1×10$^{-3}$ and k2b=2×10$^{-3}$. It can be appreciated that such values and parameters are illustrated and discussed herein for illustrative purposes and are not limiting features of the disclosed embodiments.

FIG. 5 depicts a graph 260 depicting average power over a mains half cycle for a PFC circuit. The curve 262 and the curve 264 shown in the graph 260 demonstrate that for the average power over a mains half cycle, the average value of the power can be half of the peak value of the square of a sine wave:

$$\text{Pin\_av}(k2, V\text{mainspeak}) = \frac{V\text{mainspeak}^2}{2} \cdot k2$$

Thus, fixing the value 'k2' would mean that the power level is proportional to the square of the mains voltage amplitude. Accordingly, the gain of the closed loop can be proportional to the square of the mains voltage amplitude. In some cases, it may be desirable to have a fixed gain of the total control loop. A constant gain can prevent a 0 db loop gain frequency for closed loop shifts. In this manner, an optimum dynamic response may be possible for universal mains voltage while maintaining optimum stability for the loop.

K2 therefore can include a mains voltage that is compensated by 1/Vmains^2, which allows the gain from the control-to-output power to be compensated for the mains voltage amplitude.

In a practical PFC, it may not be easy to define behavior according to this desired factor k2. Prior art DCM controllers, for example, often use on-time control with BCM or fixed frequency DCM. In BCM, the factor k2 may be more or less defined as a fixed-on-time factor, which can cause a peak current, 'Ipeak', to be proportional to the momentary mains voltage. Therefore in BCM, the input current can be proportional to "Ipeak/2' and may be also proportional to the mains voltage. In DCM with fixed frequency, the average current may no longer be 'Ipeak/2' because of the changing ratio between the 'primary+secondary' (also referred to as 'primary and secondary') stroke and the period of time.

Accordingly, there is a long-felt need for AC/DC power converters in power management systems to address the foregoing problems.

SUMMARY

Embodiments of a power correction circuit and a method of operating the power correction circuit are disclosed.

In an embodiment, a power factor corrector circuit can include a power factor corrector operable in a conduction mode within an operating frequency between a minimum value and a maximum value, wherein a measured variable k1 defines a relation between a predetermined level set for a current ripple of a peak current Ipeakh minus a peak current Ipeakl in combination with a variable a that sets a ratio between a primary and secondary stroke interval and a resulting time period.

In an embodiment, the measured variable k1 can be used to set parameters for subsequent switching cycles for the power factor corrector circuit.

In an embodiment, the measured variable k1 can be determined by setting a value of the peak current Ipeakh and the peak current Ipeakl for an actual switching cycle.

In an embodiment, the measured variable k1 can be determined by measuring a duration of the primary and secondary stroke interval comprising a parameter Tprimsec.

In an embodiment, the measured variable k1 can be determined by: calculating k1 according to k1=(Ipeakh−Ipeakl)/Tprimsec; and calculating a period of time as a switching frequency Fswitch as follows: Fswitch=k1/[(Ipeakh−Ipeakl)−a].

In an embodiment, the measured variable k1 can be determined by using a switching frequency to determine a combination of the peak current Ipeakh, the peak current Ipeakl, and the variable a to utilize in order to maintain the switching frequency Fswitch within the minimum value and the maximum value of the operating frequency of the power factor corrector circuit.

In an embodiment, the measured variable k1 can be determined by setting a value of the peak current Ipeakh and the peak current Ipeakl for an actual switching cycle, measuring a duration of the primary and secondary stroke interval comprising a parameter Tprimsec, calculating k1 according to k1=(Ipeakh−Ipeakl)/Tprimsec, calculating a period of time as a switching frequency Fswitch as follows: Fswitch=k1/[(Ipeakh−Ipeakl)−a], and using the switching frequency to determine a combination of the peak current Ipeakh, the peak current Ipeakl, and the variable a to utilize in order to maintain the switching frequency Fswitch within the minimum value and the maximum value of the operating frequency of the power factor corrector circuit.

In an embodiment, the conduction mode can comprises at least one of: a DCM (Discontinuous-Conduction Mode) and a CCM (Continuous-Conduction Mode).

In an embodiment, a power factor corrector circuit can include a power factor corrector operable in at least one of: a DCM (Discontinuous-Conduction Mode) and a CCM (Continuous-Conduction Mode) and within an operating frequency between a minimum value and a maximum value, wherein a measured variable k1 defines a relation between a predetermined level set for a current ripple of a peak current Ipeakh minus a peak current Ipeakl in combination with a variable a that sets a ratio between a primary and secondary stroke interval and a resulting time period.

In an embodiment, the measured variable k1 can be used to set parameters for subsequent switching cycles for the power factor corrector circuit.

In an embodiment, the measured variable k1 can be determined by setting a value of the peak current Ipeakh and the peak current Ipeakl for an actual switching cycle.

In an embodiment, the measured variable k1 can be determined by measuring a duration of the primary and secondary stroke interval comprising a parameter Tprimsec.

In an embodiment, the measured variable k1 can be determined by: calculating k1 according to k1=(Ipeakh−Ipeakl)/Tprimsec; and calculating a period of time as a switching frequency Fswitch as follows: Fswitch=k1/[(Ipeakh−Ipeakl)−a].

In an embodiment, the measured variable k1 can be determined by: using a switching frequency to determine a combination of the peak current Ipeakh, the peak current Ipeakl, and the variable a to utilize in order to maintain the switching frequency Fswitch within the minimum value and the maximum value of the operating frequency of the power factor corrector circuit.

In an embodiment, the measured variable k1 can be determined by: setting a value of the peak current Ipeakh and the peak current Ipeakl for an actual switching cycle, measuring a duration of the primary and secondary stroke interval comprising a parameter Tprimsec, calculating k1 according to k1=(Ipeakh−Ipeakl)/Tprimsec, calculating a period of time as a switching frequency Fswitch as follows: Fswitch=k1/[(Ipeakh−Ipeakl)−a], and using the switching frequency to determine a combination of the peak current Ipeakh, the peak current Ipeakl, and the variable a to utilize in order to maintain the switching frequency Fswitch within the minimum value and the maximum value of the operating frequency of the power factor corrector circuit.

In an embodiment, a method of operating a power factor corrector circuit, can involve operating a power factor corrector in at least one of: a DCM (Discontinuous-Conduction Mode) and a CCM (Continuous-Conduction Mode) and within an operating frequency between a minimum value and a maximum value, and measuring a variable k1 that defines a relation between a predetermined level set for a current ripple of a peak current Ipeakh minus a peak current Ipeakl in combination with a variable a that sets a ratio between a primary and secondary stroke interval and a resulting time period.

In an embodiment of the method, the measured variable k1 can be used to set parameters for subsequent switching cycles for the power factor corrector circuit.

In an embodiment of the method, the measured variable k1 can be determined by setting a value of the peak current Ipeakh and the peak current Ipeakl for an actual switching cycle.

In an embodiment of the method, the measured variable k1 can be determined by measuring a duration of the primary and secondary stroke interval comprising a parameter Tprimsec.

In an embodiment of the method, the measured variable k1 can be determined by: calculating k1 according to k1=(Ipeakh−Ipeakl)/Tprimsec, and calculating a period of time as a switching frequency Fswitch as follows: Fswitch=k1/[(Ipeakh−Ipeakl)−a].

In an embodiment of the method, the measured variable k1 can be determined by using a switching frequency to determine a combination of the peak current Ipeakh, the peak current Ipeakl, and the variable a to utilize in order to maintain the switching frequency Fswitch within the minimum value and the maximum value of the operating frequency of the power factor corrector circuit.

In an embodiment of the method, the measured variable k1 can be determined by setting a value of the peak current Ipeakh and the peak current Ipeakl for an actual switching cycle, measuring a duration of the primary and secondary stroke interval comprising a parameter Tprimsec, calculating k1 according to k1=(Ipeakh−Ipeakl)/Tprimsec, calculating a period of time as a switching frequency Fswitch as follows: Fswitch=k1/[(Ipeakh−Ipeakl)−a], and using the switching frequency to determine a combination of the peak current Ipeakh, the peak current Ipeakl, and the variable a to utilize in order to maintain the switching frequency Fswitch within the minimum value and the maximum value of the operating frequency of the power factor corrector circuit.

BRIEF DESCRIPTION OF THE DRAWINGS

Throughout the description, similar reference numbers may be used to identify similar elements.

DETAILED DESCRIPTION

Figure 1:
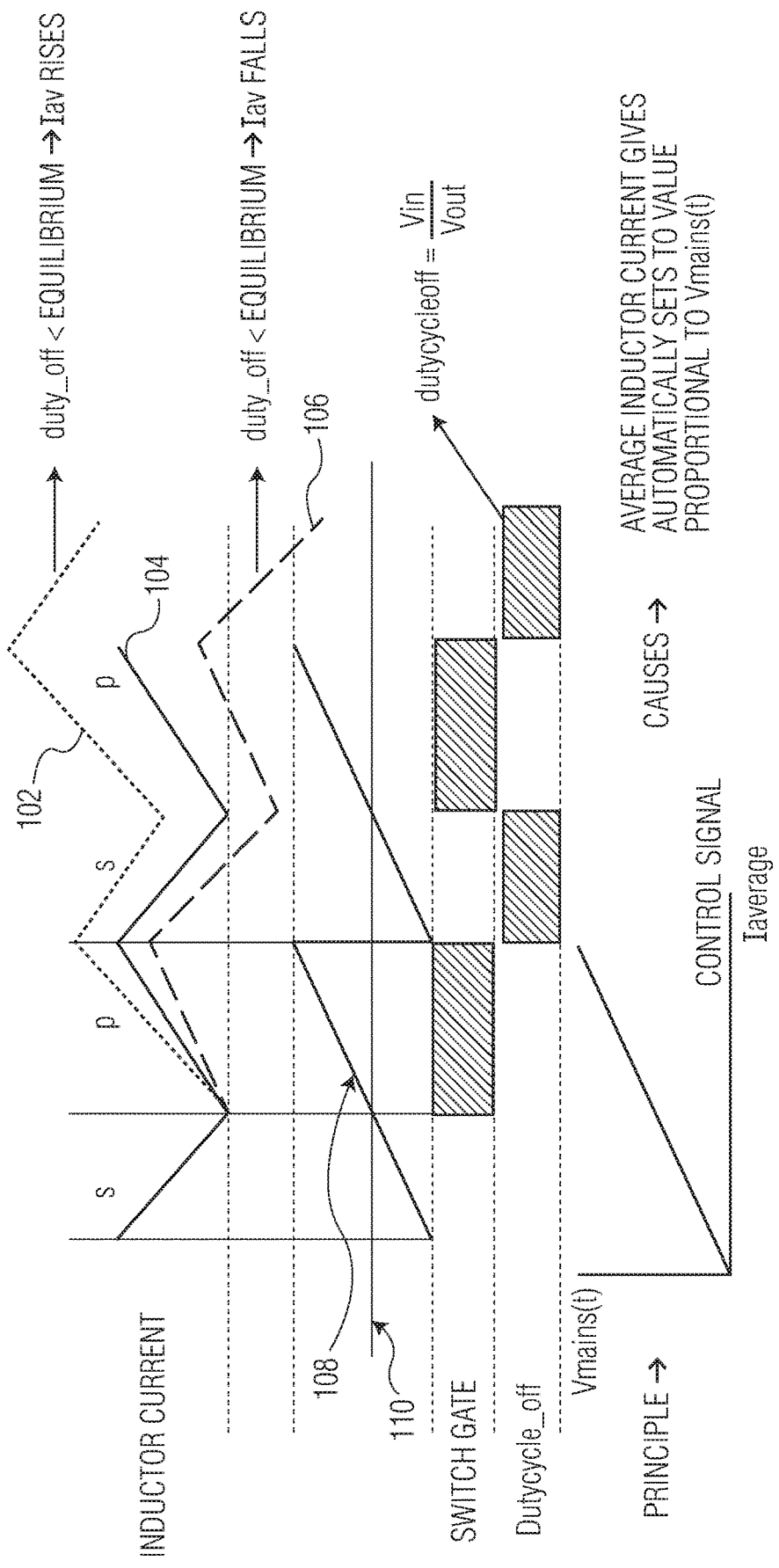
FIG. 1 depicts a waveform diagram illustrating the concept of average current control CCM.
Figure 2:
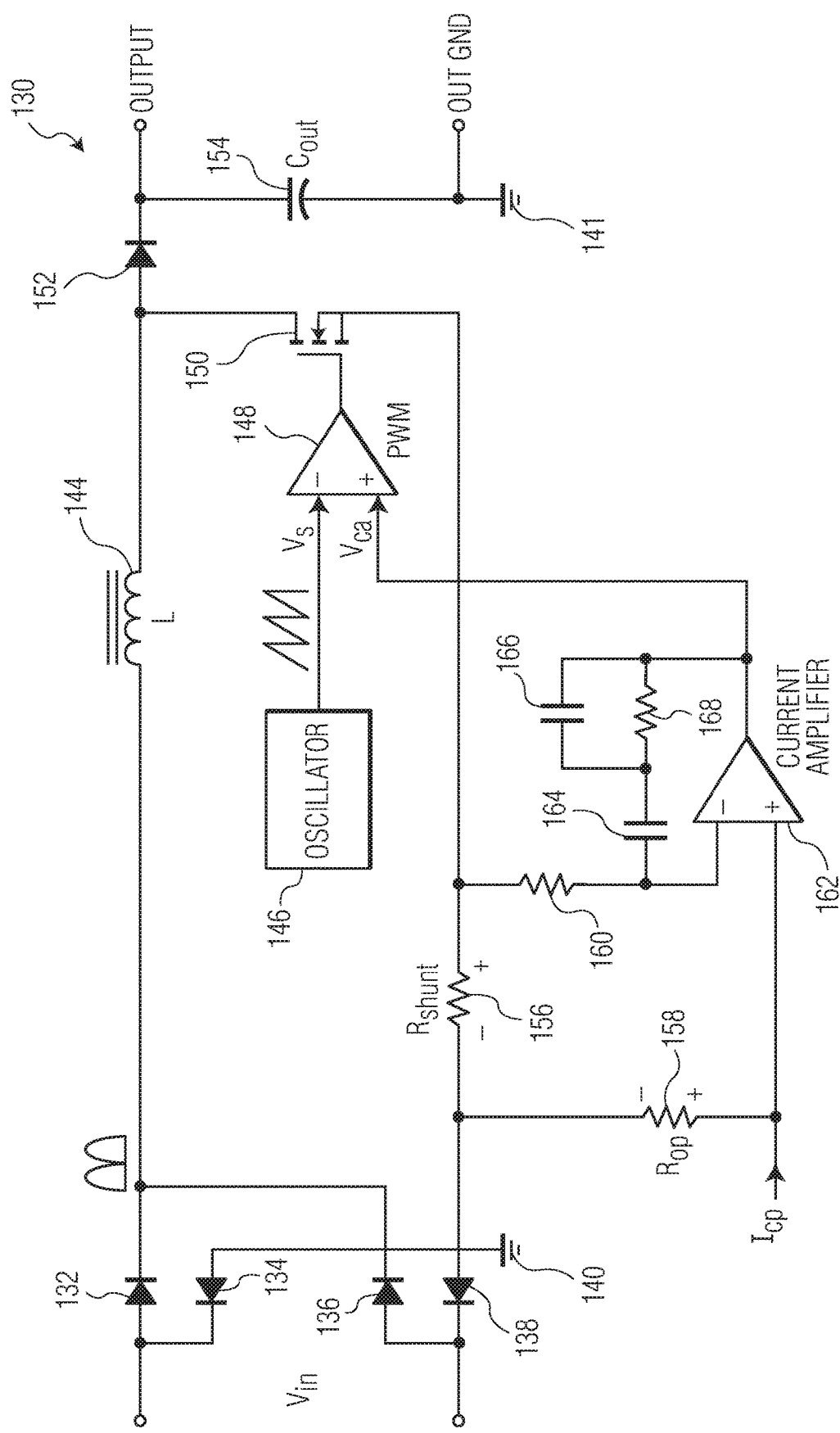
FIG. 2 depicts a schematic diagram of a power factor corrector circuit that uses the average current control principle.
Figure 3:
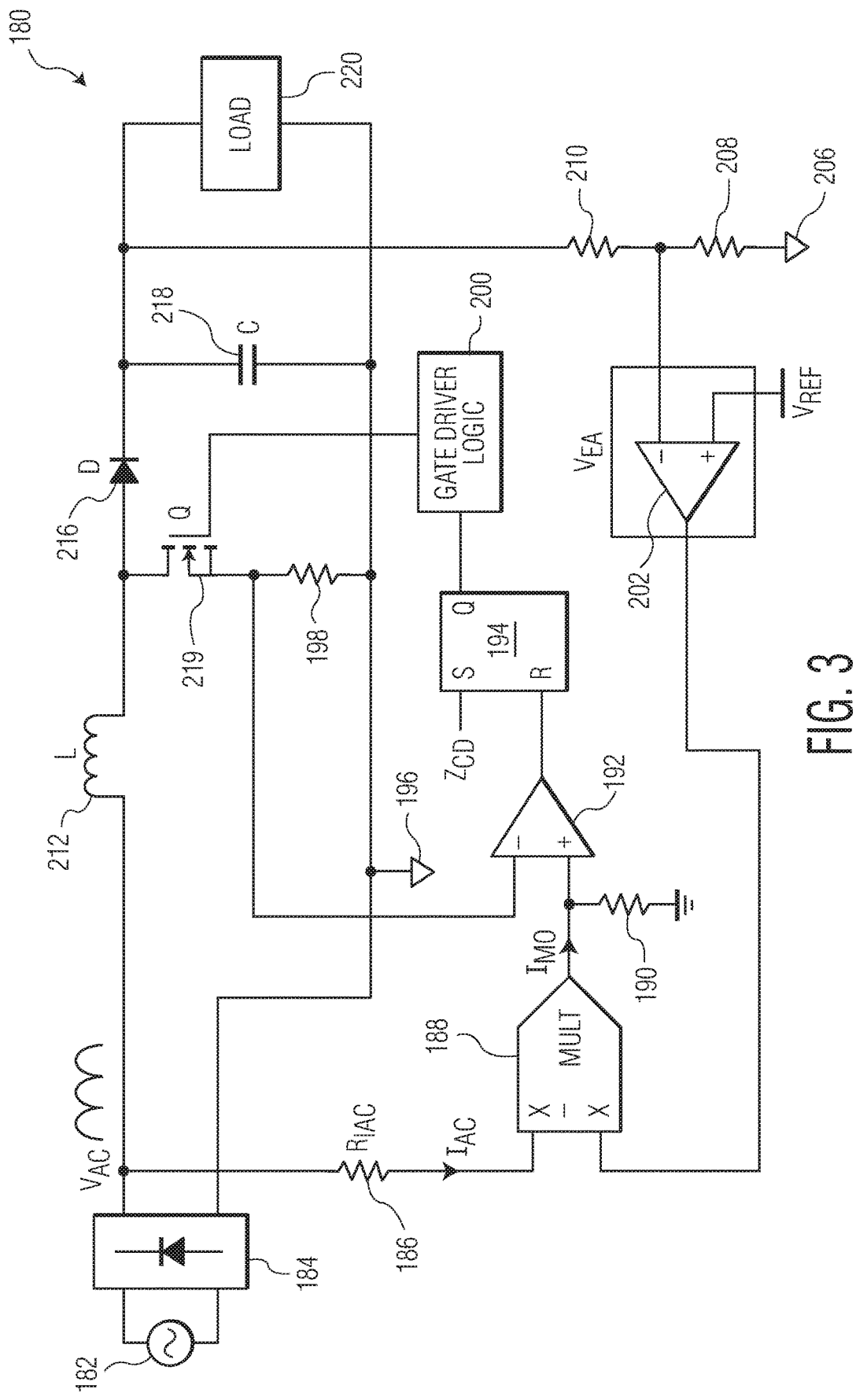
FIG. 3 depicts a schematic diagram of a control circuit using a multiplier approach.
Figure 4:
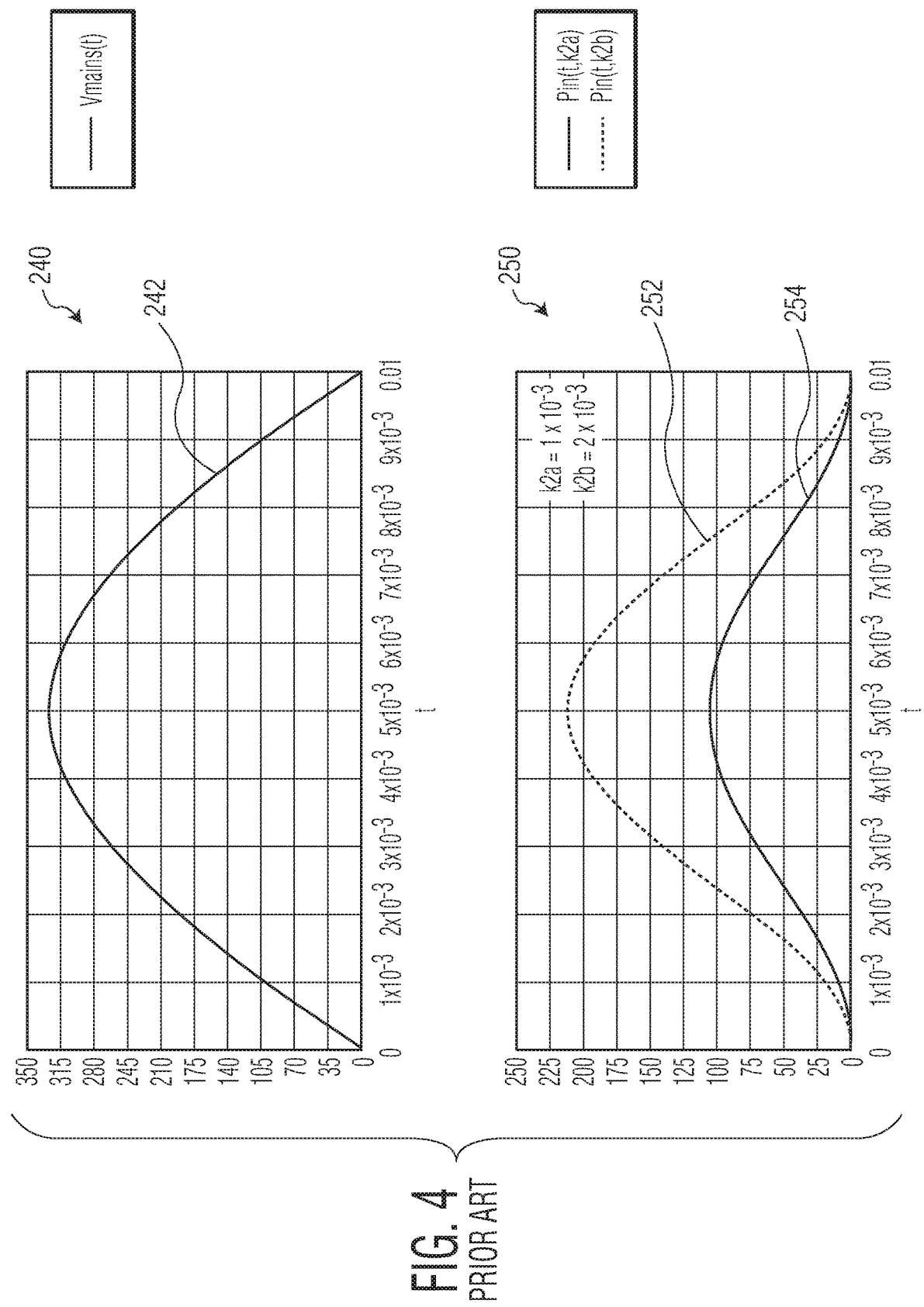
FIG. 4 depicts graphs demonstrating the relationship between momentary current voltage and power for a PFC circuit.
Figure 5:
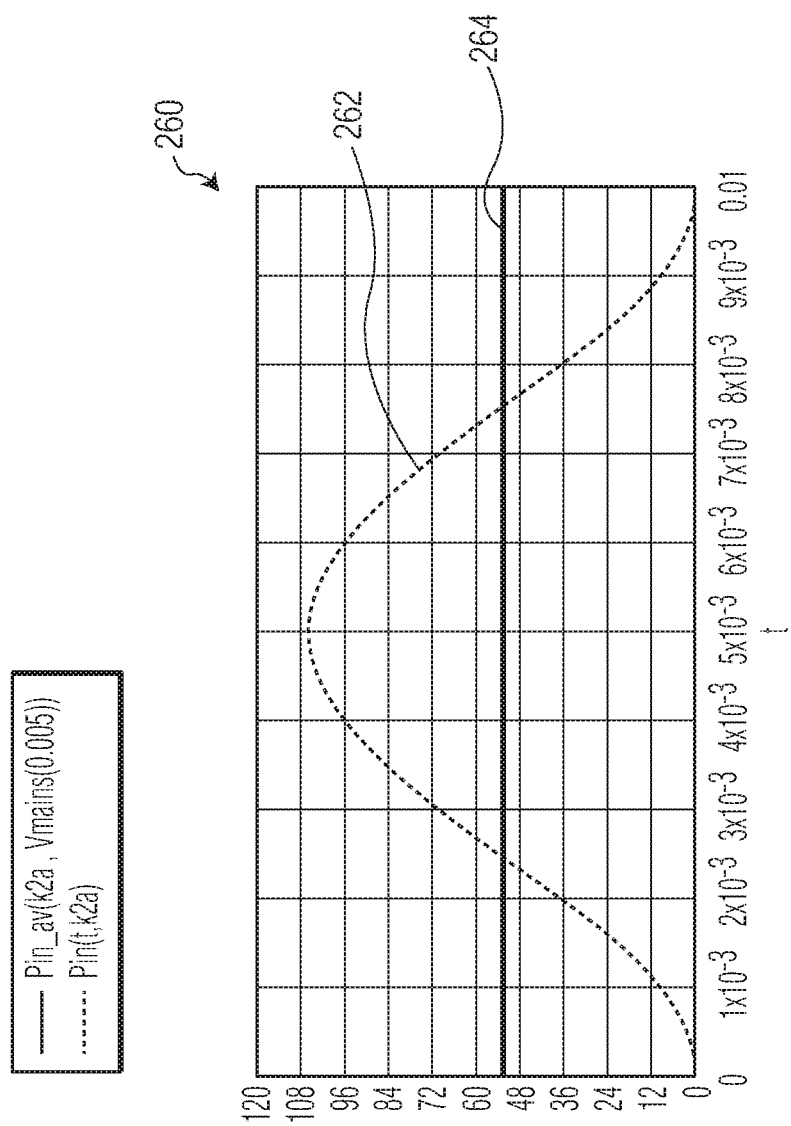
FIG. 5 depicts an example graph depicting average power over a mains half cycle for a PFC circuit.

It will be readily understood that the components of the embodiments as described herein and illustrated in the appended figures can be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects as illustrative and not restrictive. The scope of the invention is, therefore, indicated by the appended claims rather than by this detailed description. All changes, which come within the meaning and range of equivalency of the claims, can be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Several aspects of the disclosed embodiments are presented with reference to various systems, methods and devices. These systems, methods and devices are described in the following detailed description and illustrated in the accompanying drawings by various blocks, modules, components, circuits, steps, operations, processes, algorithms, engines, applications, etc. (which can be individually or collectively referred to as "elements"). These elements may be implemented using electronic hardware, computer software, or any combination thereof. Whether such elements can be implemented as hardware or software depends upon the particular application and design constraints that may be imposed on the overall system.

A current mode controlled system can prevent short long cycles. In a current mode control system, the cycle can be controlled by, for example, three variables, including a peak current Ipeakh, a peak current Ipeakl, and a parameter a, where a can be equal to a period time/(primary+secondary stroke duration).

Although a direct setting can be calculated for the peak current 'Ipeakh', the peak current 'Ipeakl' and the factor 'a' for a current mode controlled switching cycle, it may not be directly possible to predict the resulting period of time without knowledge of the actual input voltage and the actual output voltage. In addition, the used inductor value can also determine the primary+secondary stroke duration. The relation between the primary peak current and the duration of the primary+secondary stroke interval in discontinuous mode can be provided by the following equation:

$$Fbcm = \frac{Vin - (Vout - Vin)}{Ipeakh \cdot Lind \cdot Vout} \tag{1}$$

In the above equation (1), Fbcm can be equal to 1/(primary+secondary stroke interval) in a DCM operation (with Ipeakl=0). Once the parameter Fbcm is known, the resulting period time can be calculated. Such a calculation may require a measurement of the input voltage Vin and the output voltage Vout, and the inductor value can be known as well. In some cases, a customer can set the inductor value. Thus, in order to know this value, this information can be stored in a controller's IC memory.

Because the number of available IC pins may be a point of concern, in practice this means the input voltage Vin and the output voltage Vout may not be measured properly because in most cases pins may not be available to measure the input voltage Vin, while the output voltage Vout can be measured by a resistive divider where the voltage at the sense node of the resistive divider is regulated to a specific value (e.g., 2.5V) that allows the output voltage Vout to be regulated to a necessary or required value (e.g. 385V).

Because a customer may set a resistive divider, this scenario may not yield information regarding the level of the output voltage Vout. Information concerning the output voltage Vout being below or above a desired level, may be available. Such information may not be insufficient for the input voltage Vin and the output voltage Vout to properly predict a resulting operating frequency. As there may be requirements regarding the minimum operating frequency and the maximum operating frequency, it may be necessary to obtain this information in some manner.

Figure 6:
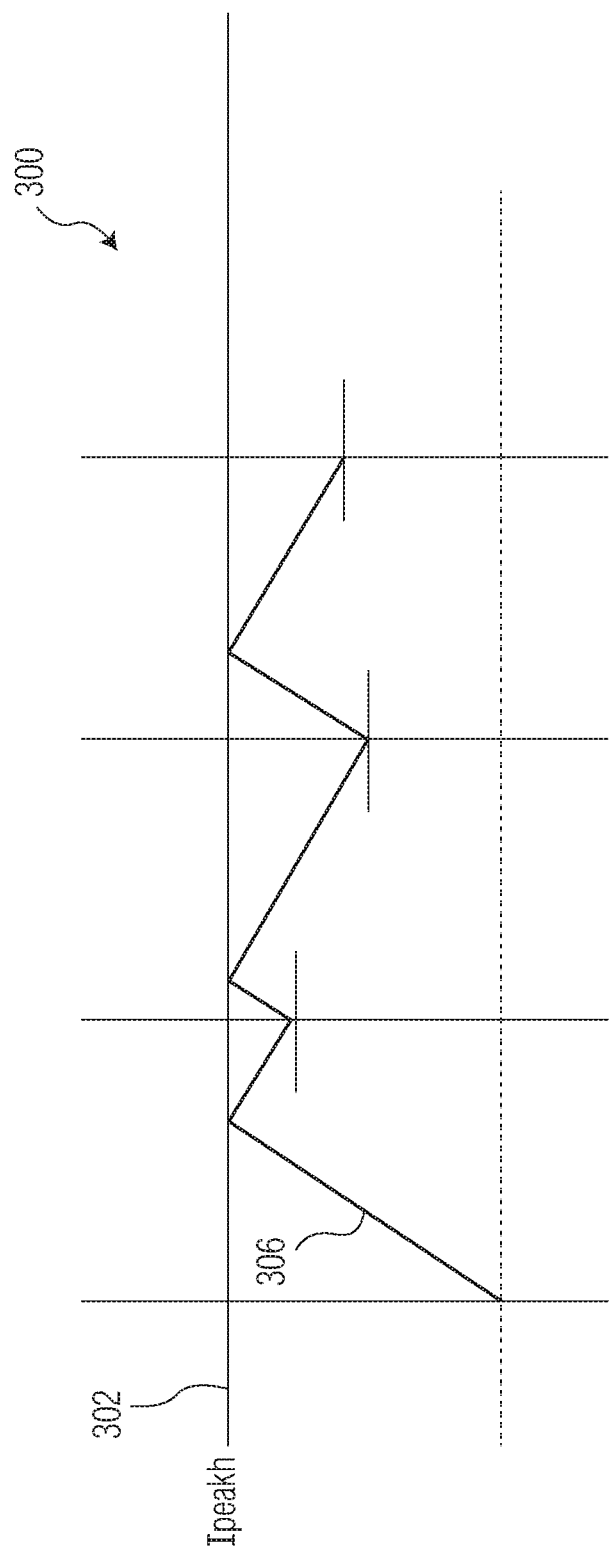
FIG. 6 depicts a waveform diagram demonstrating how a direct setting of a switching period can result in potential problems with short long cycles during a CCM operation for a power correction circuit.

FIG. 6 depicts a waveform diagram 300 demonstrating how a direct setting of a switching period can result in potential problems with short long cycles during a CCM operation for a power correction circuit. The waveform diagram 300 illustrates a wave form having short long cycles with respect to a peak current 302 or Ipeakh. While proper values for parameters can be set, which may determine a switching cycle of a power correction circuit, it is important that a direct setting of a switching period does not give rise to problems with short long cycles in a CCM operation as shown in FIG. 6.

As will be discussed in greater detail herein, the disclosed approach can solve this problem by determining a relation between current ripple (Ipeakh–Ipeakl) and the resulting interval of primary+secondary stroke. By understanding the impact of Equation (1), this relation can be used to set a variable k1 that can connect the value set for the current ripple (Ipeakh–Ipeakl) in combination with the previously discussed factor 'a' to a resulting switching frequency. In this manner, it may be possible to predict the resulting switching frequency for a next switching cycle and take action to keep the operating frequency between the limits.

A power factor corrector circuit can be configured to operate in DCM or CCM with an operating frequency limited between a minimum value and a maximum value. A variable k1 can be used to define a relation between a predetermined level set for a current ripple (Ipeakh–Ipeakl) in combination with a variable 'a' setting a ratio between an actual primary+secondary stroke interval and a resulting period of time.

A procedure to determine k1 can involve setting a value Ipeakh, Ipeakl for the actual switching cycle. After the end of the secondary stroke interval, a measurement can be taken of the duration of primary+secondary stroke (Tprimsec). The K1 value can be then calculated according to k1= (Ipeakh–Ipeakl)/Tprimsec. This information can be then used to calculate the resulting time period:

$$Fswitch = \frac{k1}{[(Ipeakh - Ipeak1) \cdot a]} \quad (2)$$

The calculated switching frequency can be then used to decide which combination of Ipeakh, Ipeakl, and 'a' to use in order to maintain the switching frequency Fswitch within limits of the minimum frequency Fmin and the maximum frequency Fmax.

Figure 7:
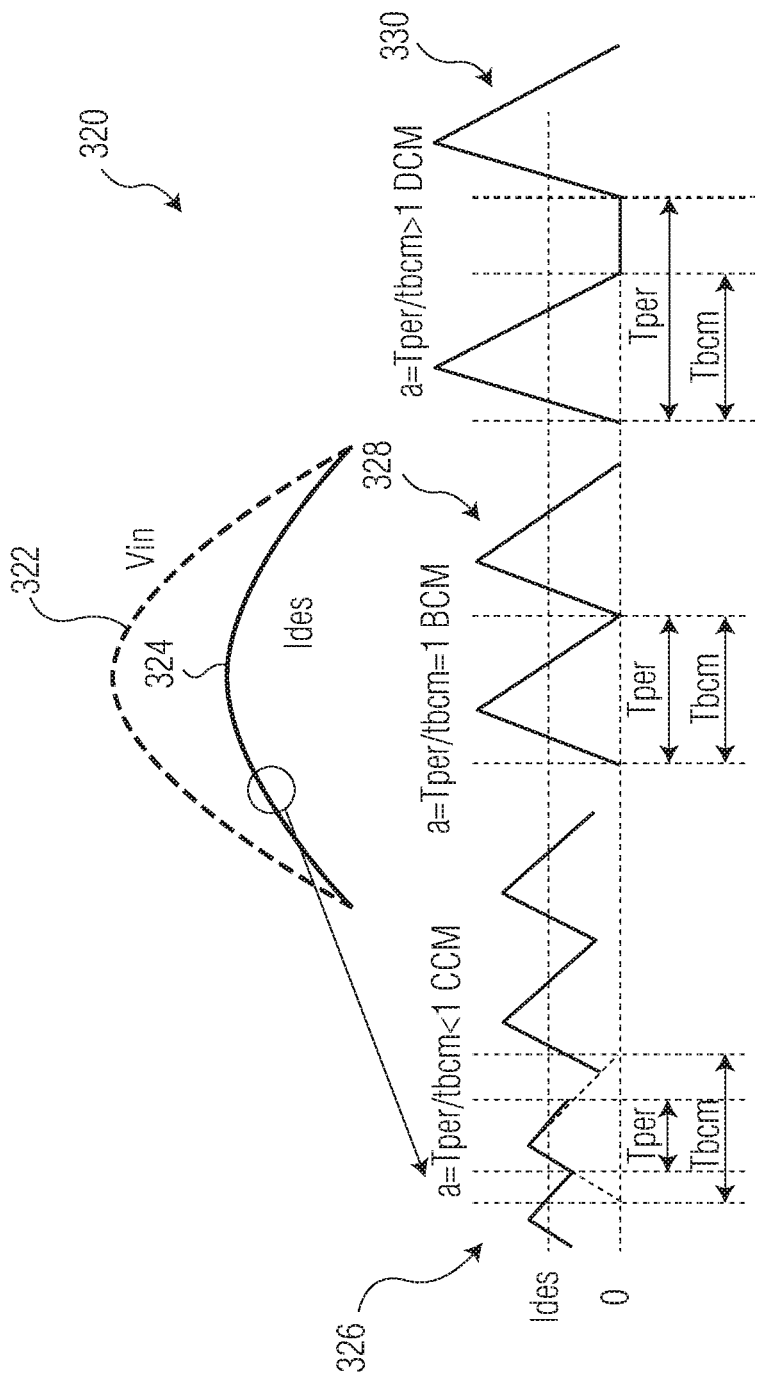
FIG. 7 depicts a schematic diagram illustrating signals related to a power factor corrector circuit wherein over a mains half cycle a desired input current can be drawn from the mains (Ides).

FIG. 7 depicts a schematic diagram demonstrating how signals related to a PFC boost converter over a mains half cycle at a desired input current (as averaged over a switching cycle) can be drawn from the mains (Ides), as indicated by a solid curve 324 and a dashed curve 322. The red triangular signals 326, 328, and 330 shown in FIG. 7 represent the PFC input current during a primary stroke, a secondary stroke and a waiting time after the primary and secondary stroke (in DCM). At a given value of Ides, an infinite amount of solutions may be still possible to realize this current, as the combination between a period time Tper and a current ripple (Ipeakh–Ipeakl) offers a degree of freedom. This degree of freedom can be defined by using a factor 'a'=Tper/Tbcm. Note that 'a' can vary between 0 (no ripple current and infinite switching frequency) and infinite (infinite ripple current and zero switching frequency).

A specific range of solutions may offer an acceptable efficiency with an operable EMI performance and within a range of a minimum operating frequency and a maximum operating frequency.

Algorithms can be implemented, which are operable to set the factor 'a'. The resulting 'Ipeakh' and 'Ipeakl' levels may also need to be set to limit the range to the Fmin-Fmax window. In order to predict the resulting operating frequency, these algorithms may need to have information concerning the relation between Ipeakh, Ipeakl, a and the resulting Tbcm in order to calculate the resulting period time and check if a, or Ipeakh, Ipeakl may need to be changed in order to meet the Fmin.

Equation (1) discussed above can result from the basic equation of an inductor current and the voltage across the inductor as derived from the set of equations (3) below, where Tprimsec=primary+secondary stroke interval:

$$u = L \cdot \frac{di}{dt} \quad (3)$$

$$Vin = Lind \cdot \frac{(Ipeakh - Ipeak1)}{Tprim} \quad Vout - Vin = Lind \cdot \frac{\left(Ipeakh - Ipeak1\right)}{Tsec}$$

$$Tprim = \frac{Lind \cdot (Ipeakh - Ipeak1)}{Vin} \quad Tsec = \frac{Lind \cdot (Ipeakh - Ipeak1)}{Vout - Vin}$$

$$Tprimsec = (Ipeakh - Ipeak1) \cdot Lind \cdot \frac{Vout}{Vin(Vout - Vin)}$$

Figure 8:
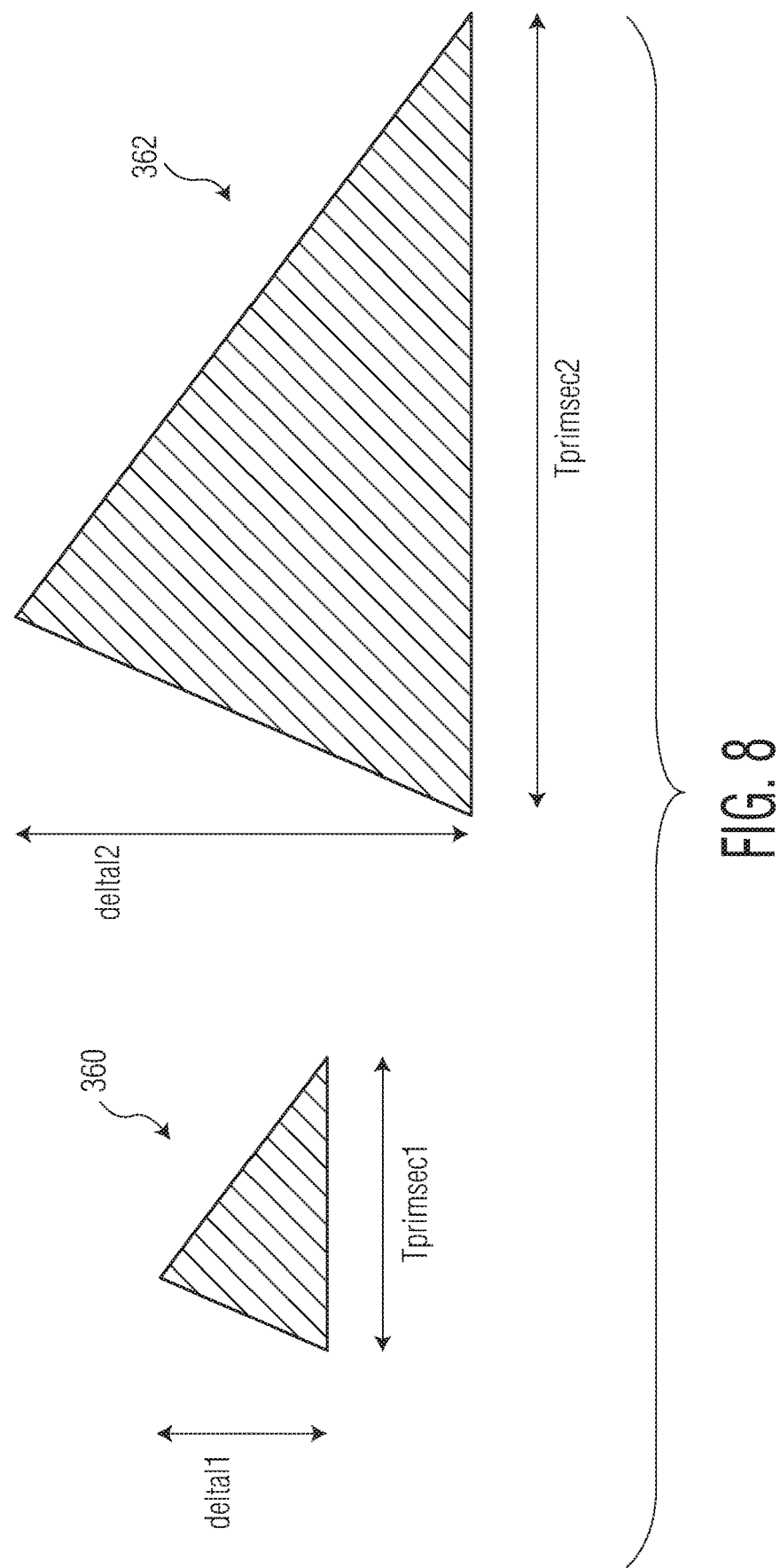
FIG. 8 depicts a schematic diagram illustrating a shape of a current during a primary stroke and a secondary stroke including triangles of differing size but with the same shape.

From this result, it is clear that there is a shape of the current during primary and secondary stroke, which can result in triangles of different sizes and the same shape. FIG. 8 depicts a schematic diagram illustrating the shape of a current during a primary stroke and a secondary stroke including triangle 360 and triangle 362 of different sizes and with the same shape.

If we define the ration k1 according to the Equation (4) below, it can follow that k1 can be fully determined by an input voltage Vin, an output voltage Vout and an inductance Lind.

$$k1 = \frac{deltaI1}{Tprimsec1} = \frac{deltaI2}{Tprimsec2} = \frac{Vin \cdot \left(\frac{Vout - Vin}{Vout}\right)}{Lind} \quad (4)$$

The value 'k1' can be then used to set a relation between the switching frequency and the peak current Ipeakh, the peak current Ipeakl, and 'a' as shown in Equations (5) below:

$$Tprimsec = \frac{Ipeakh - Ipeak1}{k1} \quad (5)$$

$$Tper = Tprimsec \cdot a = \frac{(Ipeakh - Ipeak1) \cdot a}{k1}$$

$$Fswitch = \frac{k1}{[(Ipeakh - Ipeak1) \cdot a]}$$

Equations can be then derived and used in an algorithm to calculate Ipeakh, Ipeakl and 'a' to meet certain requirements (e.g., such as Fmin<Fswitch<Fmax, Ipeakh, Ipeakl and 'a' to meet Ides) and to meet efficiency and EMI requirements, as shown in the summary of equations below:

be calculated. The parameters 'a', Ipeakh, Ipeakl can be calculated using the determined l1' value to meet certain requirements, such as, for example, Fmin<Fswitch<Fmax, and Ipeakh, Ipeakl according to a desired efficiency and/or EMI requirements.

equation summary

| DCM | | CCM | |
|---|---|---|---|
| $a = \dfrac{Tper}{Tbcm}$ | (1) | $a = \dfrac{Tper}{Tbcm}$ | (1) |
| $k1 = \dfrac{Ipeakh}{TBCM}$ | (2) | $k1 = \dfrac{Ipeakh}{TBCM}$ | (2) |
| $Ides = \dfrac{Ipeakh}{2a}$ | (3) | $Ides = Ipeakh \cdot \left(1 - \dfrac{a}{2}\right)$ | (4) |
| $a = \dfrac{Ipeakh}{2Ides}$ | (5) | $a = 2 - \dfrac{2Ides}{Ipeakh}$ | (6) |
| | | $a = 1 - \dfrac{Ipeakl}{Ipeakh}$ | (7) |
| $Fswitch = \dfrac{FBCM}{a}$ | (8) | $Fswitch = \dfrac{FBCM}{a}$ | (8) |
| $k1 = \dfrac{Ipeakh}{Tbcm}$ | (9) | $k1 = \dfrac{Ipeakh}{Tbcm}$ | (9) |
| $(1+9)\ Fswitch = \dfrac{k1}{a \cdot (Ipeakh)}$ | (10) | $Fswitch = \dfrac{k1}{a \cdot (Ipeakh)}$ | (10) |
| $(1+9+5)\ Fswitch = \dfrac{k1 \cdot (2Ides)}{Ipeakh^2}$ | (10c) | $Fswitch = \dfrac{k1}{2 \cdot (Ides - Ipeakh)}$ | (10b) |
| $Ipeald = 0$ | | | |
| | | $Ipeak1 = Ipeakh \cdot (1 - a)$ | (7) |
| $(5+10)\ Ipeakh = \sqrt{\dfrac{2 \cdot k1 \cdot Ides}{Fswitch}}$ | (12) | $(6+10)\ Ipeakh = \dfrac{k1}{2 \cdot Fswitch} + Ides$ | (11) |
| $FBCM = \dfrac{Vin \cdot \left(\dfrac{Vout - Vin}{Vout}\right)}{L \cdot (Ipeakh)}$ | (13) | | |
| $(9+13)\ k1 = \dfrac{Vin \cdot \left(\dfrac{Vout - Vin}{Vout}\right)}{L}$ | (14) | | |

Using these equations, a method can be implemented to use the predicted Fswitch to adapt a, Ipeakh, Ipeakl to set the proper switching frequency for the next switching cycle. An embodiment using such an approach is shown in FIG. 9, which depicts a flow chart of operations depicting a method 380 for using a predicted switch frequency to adapt peak currents for setting a proper switching frequency for a next switching cycle.

Figure 9:
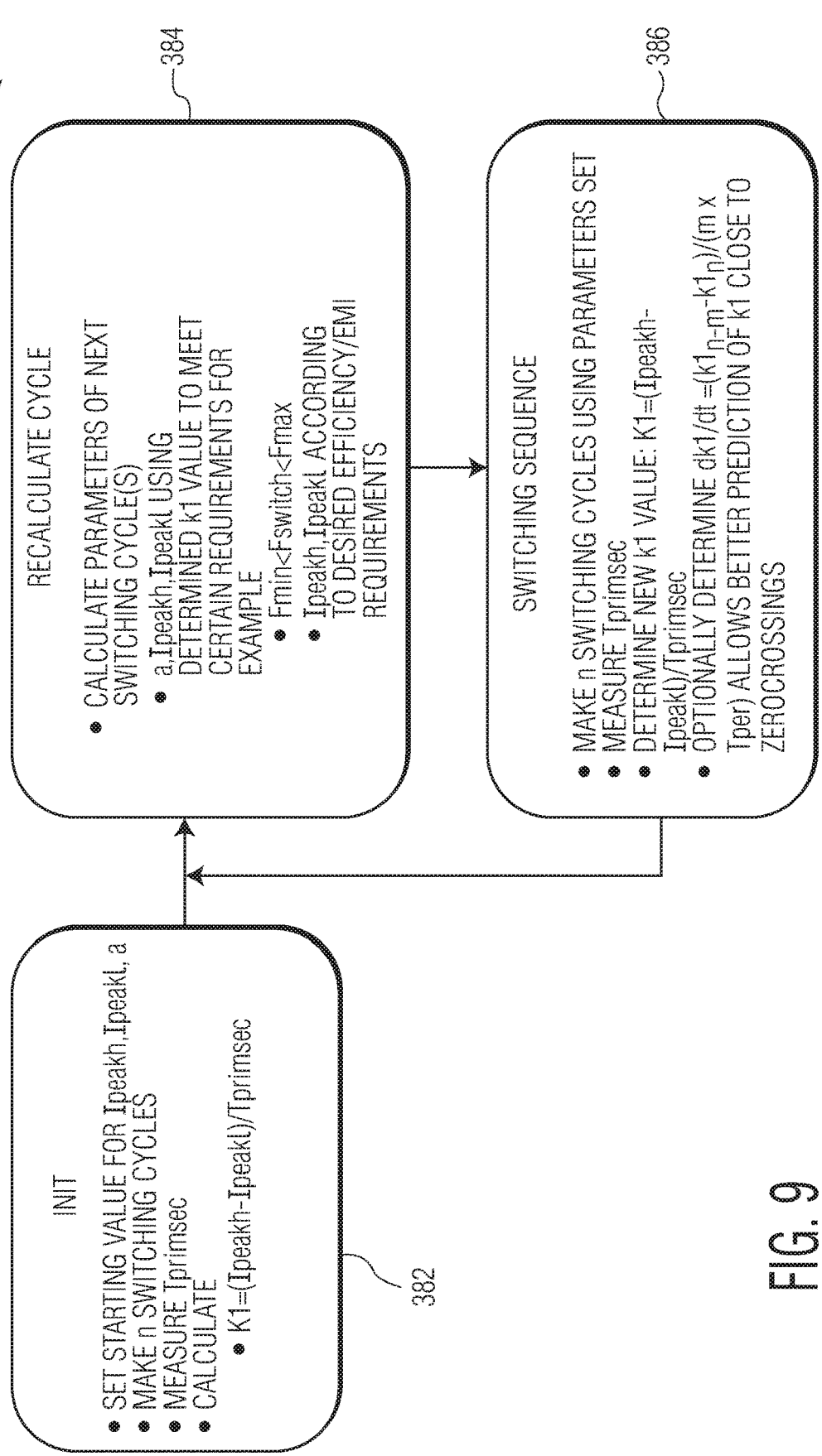
FIG. 9 depicts a flow chart of operations depicting a method for using a predicted switch frequency to adapt peak currents for setting a proper switching frequency for a next switching cycle.

As shown in FIG. 9, an operation can be implemented, as depicted at block 382, to initiate ("Init") the method 380. As shown at block 382, the starting value for Ipeakh, Ipeakl, and 'a' can be set for 'n' switching cycles. Then, Tprimsec can be measured, and a calculation performed for K1= (Ipeakh−Ipeakl)/Tprimsec. Thereafter, as illustrated at block 384, a recalculate cycle can be implemented. In the recalculated cycle, parameters of the next switching cycle(s) can Thereafter, as indicated at block 386, a switching sequence can be implemented that can involve making 'n' switching cycles using set parameters, measuring Tprimsec, determining a new l1' value according to K1=(Ipeakh−Ipeakl)/Tprimsec, optionally determining $dk1/dt = (k1_{n-m} - k1_n)/(m \times Tper)$ to allow for a better prediction of 'k1' close to zero crossings.

Figure 10:
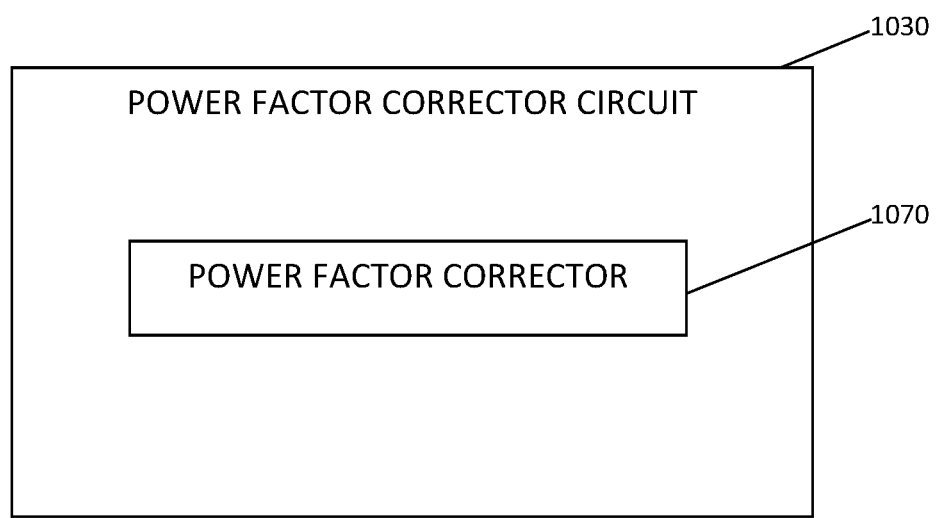
FIG. 10 shows a power factor corrector circuit according to an embodiment of the invention.

FIG. 10 shows a power factor corrector circuit 1030 according to an embodiment of the invention. In the embodiment depicted in FIG. 10, the power factor corrector circuit includes a power factor corrector 1070.

Although the operations of the method(s) disclosed herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations and elements for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention and elements thereof may be implemented entirely in hardware or in an implementation containing hardware and software elements. In embodiments that use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A power factor corrector circuit, comprising:
a power factor corrector operable in a conduction mode within an operating frequency between a minimum value and a maximum value, wherein a measured variable (k1) defines a relation between a switching frequency (Fswitch), a predetermined level set for a current ripple that is equal to a peak current (Ipeakh) minus a peak current (Ipeakl) in combination with a variable (a) that represents a ratio between a stroke duration of the power factor corrector and a resulting time period.

2. The power factor corrector circuit of claim 1 wherein k1 is used to set parameters for subsequent switching cycles for the power factor corrector circuit.

3. The power factor corrector circuit of claim 1 wherein k1 is determined by setting a value of Ipeakh and Ipeakl for an actual switching cycle.

4. The power factor corrector circuit of claim 1 wherein k1 is determined by measuring a duration of the stroke duration comprising a parameter (Tprimsec).

5. The power factor corrector circuit of claim 1 wherein k1 is determined by:
calculating k1 according to k1=(Ipeakh−Ipeakl)/Tprimsec;
calculating a period of time as Fswitch as follows:

$F\text{switch}=k1/[(Ipeakh-Ipeakl).a]$.

6. The power factor corrector circuit of claim 1 wherein k1 is determined by:
using Fswitch to determine a combination of Ipeakh, Ipeakl, and a to utilize in order to maintain Fswitch within the minimum value and the maximum value of the operating frequency of the power factor corrector circuit.

7. The power factor corrector circuit of claim 1 wherein k1 is determined by:
setting a value of Ipeakh and Ipeakl for an actual switching cycle;
measuring a duration of the stroke duration comprising a parameter (Tprimsec);
calculating k1 according to k1=(Ipeakh−Ipeakl)/Tprimsec;
calculating a period of time as Fswitch as follows:

$F\text{switch}=k1/[(Ipeakh-Ipeakl).a]$; and using the switching frequency to determine a combination of Ipeakh, Ipeakl, and a to utilize in order to maintain Fswitch within the minimum value and the maximum value of the operating frequency of the power factor corrector circuit.

8. The power factor corrector circuit of claim 1 wherein the conduction mode comprises at least one of: a DCM (Discontinuous-Conduction Mode) and a CCM (Continuous-Conduction Mode).

9. A power factor corrector circuit, comprising:
a power factor corrector operable in at least one of: a DCM (Discontinuous-Conduction Mode) and a CCM (Continuous-Conduction Mode) and within an operating frequency between a minimum value and a maximum value, wherein a measured variable (k1) defines a relation between a switching frequency (Fswitch), a predetermined level set for a current ripple that is equal to a peak current (Ipeakh) minus a peak current (Ipeakl) in combination with a variable (a) that represents a ratio between a stroke duration of the power factor corrector and a resulting time period.

10. The power factor corrector circuit of claim 9 wherein k1 is used to set parameters for subsequent switching cycles for the power factor corrector circuit.

11. The power factor corrector circuit of claim 9 wherein k1 is determined by setting a value of Ipeakh and Ipeakl for an actual switching cycle.

12. The power factor corrector circuit of claim 9 wherein k1 is determined by measuring a duration of the stroke duration comprising a parameter (Tprimsec).

13. The power factor corrector circuit of claim 9 wherein k1 is determined by:
calculating k1 according to k1=(Ipeakh−Ipeakl)/Tprimsec;
calculating a period of time as Fswitch as follows:

$F\text{switch}=k1/[(Ipeakh-Ipeakl).a]$.

14. The power factor corrector circuit of claim 9 wherein k1 is determined by:
using Fswitch to determine a combination of Ipeakh, Ipeakl, and a to utilize in order to maintain Fswitch within the minimum value and the maximum value of the operating frequency of the power factor corrector circuit.

15. The power factor corrector circuit of claim 9 wherein k1 is determined by:
setting a value of Ipeakh and Ipeakl for an actual switching cycle;
measuring a duration of the stroke duration comprising a parameter (Tprimsec);
calculating k1 according to k1=(Ipeakh−Ipeakl)/Tprimsec;
calculating a period of time as Fswitch as follows:

$F\text{switch}=k1/[(Ipeakh-Ipeakl).a]$; and using Fswitch to determine a combination of Ipeakh, Ipeakl, and a to utilize in order to maintain Fswitch within the minimum value and the maximum value of the operating frequency of the power factor corrector circuit.

16. A method of operating a power factor corrector circuit, comprising:
    operating a power factor corrector in at least one of: a DCM (Discontinuous-Conduction Mode) and a CCM (Continuous-Conduction Mode) and within an operating frequency between a minimum value and a maximum value; and
    measuring a variable (k1) that defines a relation between a switching frequency (Fswitch), a predetermined level set for a current ripple that is equal to a peak current (Ipeakh) minus a peak current (Ipeakl) in combination with a variable a that represents a ratio between a stroke duration of the power factor corrector and a resulting time period.

17. The method of claim 16, wherein k1 is used to set parameters for subsequent switching cycles for the power factor corrector circuit.

18. The method of claim 16, wherein k1 is determined by setting a value of Ipeakh and Ipeakl for an actual switching cycle.

19. The method of claim 16, wherein k1 is determined by:
    measuring a duration of the stroke duration comprising a parameter (Tprimsec);
    calculating k1 according to k1=(Ipeakh−Ipeakl)/Tprimsec; and
    calculating a resulting period time as Fswitch as follows:

$$F\text{switch}=k1/[(I\text{peak}h-I\text{peak}l).a].$$

20. The method of claim 16, wherein k1 is determined by:
    using Fswitch to determine a combination of Ipeakh, Ipeakl, and a to utilize in order to maintain Fswitch within the minimum value and the maximum value of the operating frequency of the power factor corrector circuit.

* * * * *